United States Patent [19]

Ikawa et al.

[11] Patent Number: 5,370,852
[45] Date of Patent: Dec. 6, 1994

[54] PRIMARY PARTICLES OF AMORPHOUS SILICA COMPOSITE MATERIAL, SECONDARY PARTICLES OF AMORPHOUS SILICA COMPOSITE MATERIAL, SHAPED BODIES THEREOF AND PROCESSES FOR THEIR PREPARATION

[75] Inventors: Kiyoshi Ikawa; Shinji Nakagawa, both of Gifu, Japan

[73] Assignee: Japan Insulation Co., Ltd., Osaka, Japan

[21] Appl. No.: 49,588

[22] Filed: Apr. 20, 1993

Related U.S. Application Data

[63] Continuation of Ser. No. 700,175, May 20, 1991, abandoned.

[30] Foreign Application Priority Data

Sep. 25, 1989 [JP] Japan .................. 1-249637

[51] Int. Cl.⁵ ............................ C01B 33/12
[52] U.S. Cl. .......................... 423/335; 423/331; 423/332
[58] Field of Search .................. 423/331, 335

[56] References Cited

U.S. PATENT DOCUMENTS

| | | | |
|---|---|---|---|
| 3,301,635 | 1/1967 | Bergna et al. | 423/335 |
| 4,294,810 | 10/1981 | Taga et al. | 423/331 |
| 4,330,519 | 5/1982 | Takahashi et al. | 502/216 |
| 4,992,251 | 2/1991 | Aldcroft et al. | 423/335 |

FOREIGN PATENT DOCUMENTS

| | | |
|---|---|---|
| 2313315 | 12/1976 | France . |
| 153107 | 12/1981 | Germany . |
| 62-041712 | 2/1987 | Japan . |
| 63-041849 | 8/1988 | Japan . |

*Primary Examiner*—Anthony McFarlane
*Attorney, Agent, or Firm*—Armstrong, Westerman, Hattori, McLeland & Naughton

[57] ABSTRACT

The invention provides:

primary particles of amorphous silica composite material, characterized in that they are composed of numerous granular amorphous silica particles randomly attached to amorphous silica particles retaining the original configuration of calcium silicate crystals as starting crystals and having a crystalline appearance;

secondary particles of amorphous silica composite material, characterized in that they are composed of said primary particles randomly three-dimensionally interlocked with one another;

shaped bodies of amorphous silica composite material, characterized in that they are composed of either or both of said primary particles and said secondary particles randomly three-dimensionally interlocked with one another; and processes for preparing said primary particles, said secondary particles or said shaped bodies thereof.

9 Claims, 3 Drawing Sheets

PRIMARY PARTICLES OF AMORPHOUS SILICA COMPOSITE MATERIAL, SECONDARY PARTICLES OF AMORPHOUS SILICA COMPOSITE MATERIAL, SHAPED BODIES THEREOF AND PROCESSES FOR THEIR PREPARATION

This application is a continuation of application Ser. No. 07/700,175 filed May 20, 1991, now abandoned.

BACKGROUND OF THE INVENTION

1. Field of the Invention

The present invention relates to novel primary particles of amorphous silica composite material, secondary particles of said amorphous silica composite material, shaped bodies thereof and processes for producing them.

2. DESCRIPTION OF THE PRIOR ART

The applicant previously proposed: amorphous silica having a property of shaping without use of a binder or the like and an excellent lightweight property; primary particles of amorphous silica prepared by carbonating calcium silicate crystals and treating the reaction product with an acid, said particles retaining the configuration of calcium silicate crystals as original crystals and having a crystalline appearance; secondary particles of amorphous silica composed of said primary particles randomly three-dimensionally interlocked with one another; and shaped bodies thereof (Japanese Examined Patent Publications Nos. 58,436/1986, 41,849/1988 and 41,850/1988 and U.S. Pat. No. 4,230,765). However, these amorphous silica particles have a property of adsorbing, e.g., water and organic materials such as dyes to an extent which is not invariably satisfactory.

On the other hand, the amorphous silica prepared by decomposing an aqueous solution of sodium silicate with hydrochloric acid, sulfuric acid or like acid or with carbon dioxide gas, namely the so-called silica gel of the wet process type, has an excellent adsorbing property, but suffers the drawbacks of lacking a shapability and having a poor lightweight property.

SUMMARY OF THE INVENTION

It is an object of the present invention to provide novel primary particles of amorphous silica composite material having an excellent adsorbing property, a shapability and an outstanding lightweight property, secondary particles thereof and processes for preparing them.

It is another object of the invention to provide shaped bodies of novel primary particles of amorphous silica composite material which bodies are excellent in adsorbing property and in insulating properties, lightweight and high in strength, and shaped bodies of secondary particles thereof and processes for preparing them.

These and other objects of the present invention will become more apparent from the following description.

According to the present invention, there are provided:

primary particles of amorphous silica composite material, characterized in that they are composed of numerous granular amorphous silica particles derived from alkali silicate and randomly attached to amorphous silica particles derived from primary calcium silicate crystals and retaining the original configuration of calcium silicate crystals as starting crystals and having a crystalline appearance;

secondary particles of amorphous silica composite material, characterized in that they are composed of said primary particles randomly three-dimensionally interlocked with one another;

shaped bodies of amorphous silica composite material, characterized in that they are composed of either or both of said primary particles and said secondary particles randomly three-dimensionally interlocked with one another; and processes for preparing said primary particles, said secondary particles or said shaped bodies thereof.

DESCRIPTION OF THE PREFERRED EMBODIMENTS

The present inventors conducted research and found that primary particles of amorphous silica composite material composed of granular amorphous silica particles derived from alkali silicate and randomly attached to the primary particles of amorphous silica (namely those previously developed by applicant) derived from primary calcium silicate crystals and retaining a crystalline appearance, and secondary particles thereof, are lightweight and have an excellent adsorbing property and a shapability, and that the shaped bodies formed of these primary or secondary particles are lightweight, satisfactory in strength and outstanding in insulating properties while retaining the excellent adsorbing property.

The present invention was accomplished on the basis of these novel findings.

The primary particles of amorphous silica composite material according to the invention are units constituting the secondary particles thereof and have a novel structure which is entirely unknown. The primary particles thereof have a unique structure in which, for example, numerous granular alkali silicate-derived amorphous silica particles having a particle size of usually about 50 to about 2,000Å are randomly attached to amorphous silica particles having a crystalline appearance and retaining the original configuration of calcium silicate crystals used as the starting crystals, examples of usable calcium silicate crystals being crystals of natural or synthetic materials such as crystals of xonotlite, tobermorite, foshagite, gyrolite, wollastonite, α-dicalcium silicate hydrate, tricalcium silicate, hillebrandite, rohsenhanite, truscottite, reyerite, calcio-condrodite, kilchoanite, afwillite, quasi-crystalline calcium silicate (CSH$_n$), etc. The foregoing amorphous silica particles having a crystalline appearance retain the original chain structure of SiO$_4$ tetrahedrons constituting the skeleton construction of calcium silicate crystals used as the starting calcium crystals, and have configurations and dimensions substantially corresponding to the appearance and the dimensions of original crystals. For example, the amorphous silica particles produced from strip-like crystals of calcium silicates such as crystals of xonotlite, foshagite, wollastonite, etc., have a strip-like configuration dimensionally substantially equal to that of the crystals, and those formed from plate-like crystals of calcium silicates such as crystals of tobermorite, gyrolite, etc. have a plate-like configuration dimensionally substantially equal to that of the crystals.

The granular amorphous silica particles attached to amorphous silica particles having a crystalline appearance are rarely separated even when dispersed by means of supersonic waves and are presumed, therefore, to be firmly united thereto by chemical bond such as siloxane bond.

Figure 1:
FIG. 1 is a scanning electron micrograph (magnification of 25,000 X) showing the primary particles of composite material of the invention prepared in Example 1.

When observed under a scanning electron microscope, the primary particles of amorphous silica composite material of the invention are seen to have the foregoing structure. More specifically, this structure is apparent from, for example, FIG. 1. FIG. 1 is a scanning electron micrograph (magnification of 25,000 X) showing the primary particles of composite material of the invention prepared in Example 1. The photograph reveals that the primary particles are those in which numerous granular amorphous silica particles derived from sodium silicate are randomly attached to amorphous silica particles retaining the original configuration of xonotlite crystals used as the starting crystals.

Figure 2A:
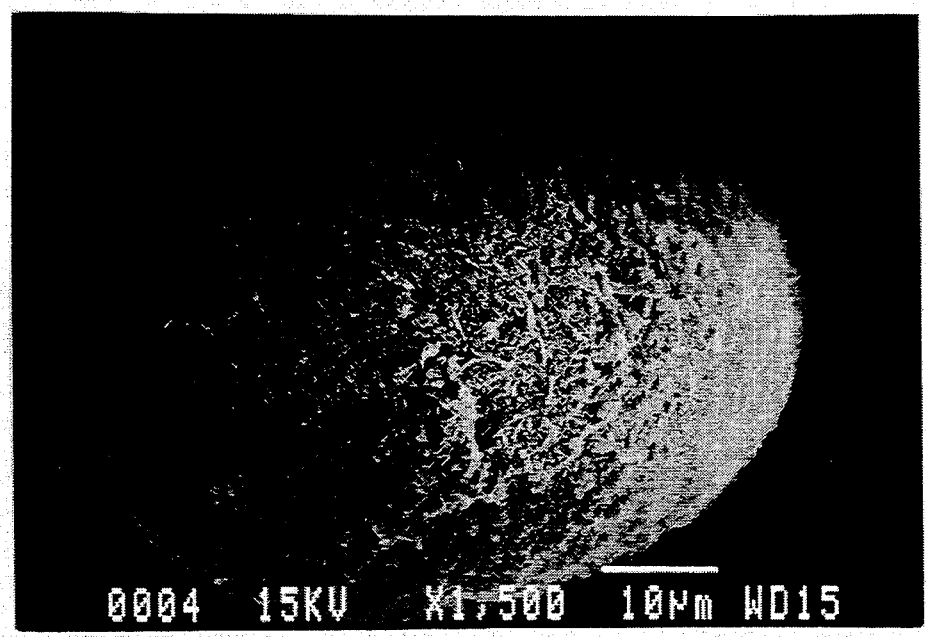
FIG. 2A is a scanning electron micrograph (magnification of 1500 X) showing the secondary particles of amorphous silica composite material of the invention prepared in Example 2.
Figure 2B:
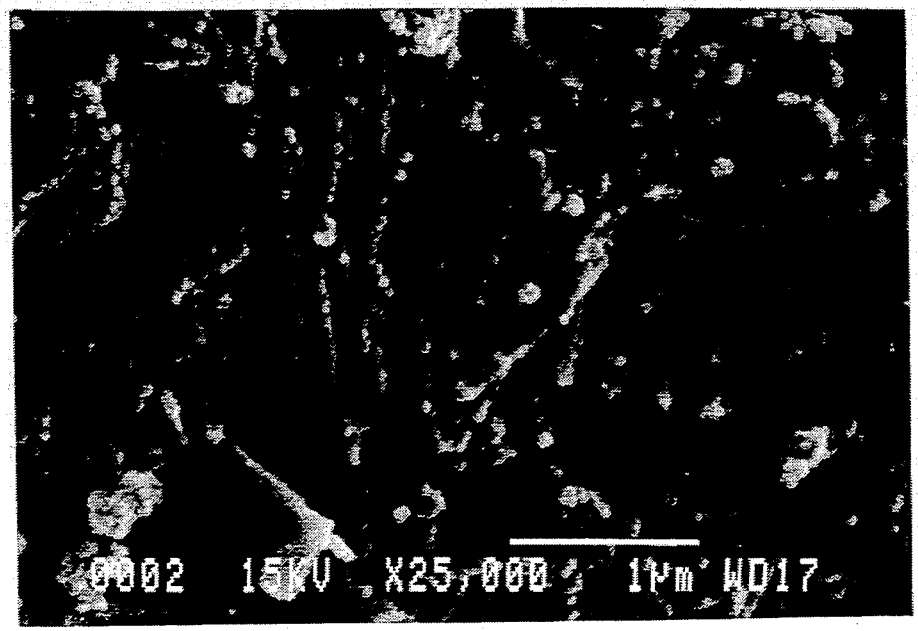
FIG. 2B is a scanning electron micrograph (magnification of 25,000 X) showing the secondary particles of amorphous silica composite material of the invention prepared in Example 2.

The secondary particles of amorphous silica composite material according to the invention are composed of the foregoing primary particles of amorphous silica composite material agglomerated and randomly three-dimensionally interlocked with one another, and are usually in the form of substantially globular particles having a diameter of about 10 to about 150 μm. The structure of the secondary particles can be seen by observing such particles under a scanning electron microscope. More specifically, the structure is clear from FIGS. 2A and 2B, which are scanning electron micrographs of secondary particles of composite material according to the invention.

The primary particles of amorphous silica composite material of the present invention and the secondary particles thereof have the features that they are outstanding in the property of adsorbing water, organic materials and the like, particularly in hygroscopicity and dye-adsorbing property in the atmosphere of high humidity, and they have a shapability and an apparent specific gravity of about 0.1 g/cm$^3$, namely are exceedingly lightweight.

The primary particles of amorphous silica composite material of the present invention or the secondary particles thereof can be suitably prepared as by adding alkali silicate to an aqueous slurry of primary particles of calcium silicate crystals or secondary particles thereof, carbonating the slurry and treating the reaction product with an acid.

The secondary particles of calcium silicate crystals useful as the starting material can be prepared as by subjecting a slurry of a siliceous material, a lime material and water to hydrothermal synthesis reaction with heating and stirring under pressure, producing an aqueous slurry of secondary particles. The obtained aqueous slurry of secondary particles of calcium silicate crystals may be used directly as the starting material in preparing the secondary particles of composite material of the invention, or may be dried into powder which is reconstituted before use to provide an aqueous slurry as the starting material. The primary particles of calcium silicate crystals for use as the other starting material can be suitably prepared by crushing said secondary particles and dispersing the obtained finer particles by means of, e.g. supersonic waves. Other alternatives include powders prepared by pulverizing a material selected from a wide variety of natural or synthetic materials predominantly containing calcium silicate, such as autoclaved lightweight concrete (ALC), calcium silicate-based insulation materials, building materials, etc. A further option is the material prepared by, when required, heating a slurry of a siliceous material, a lime material and water to cause gelation, subjecting the gel to hydrothermal synthesis reaction and dispersing the obtained reaction product into primary particles.

Useful siliceous materials include, for example, natural or synthetic siliceous materials and industrial by-products containing usually at least 90% by weight of silica, and can be any of amorphous materials and crystalline materials, such as quartz, silicon dust, white carbon, etc. Useful lime materials are, for example, quick lime, slaked lime, cement, etc. which contain calcium as the main component. The ratio of siliceous material and lime material used in hydrothermal synthesis reaction is adjusted according to the molar ratio of the desired crystals of calcium silicate (CaO: SiO$_2$). A suitable amount of water is added to the siliceous material and the lime material, and the mixture is subjected to hydrothermal synthesis reaction with stirring when so required, giving calcium silicate crystals.

Subsequently alkali silicate is added to the aqueous slurry of primary or secondary particles of calcium silicate crystals thus obtained. A preferred amount of the alkali silicate used is in such range that the ratio by weight of SiO$_2$ in the alkali silicate to SiO$_2$ in the solids content of the primary or secondary particles of calcium silicate crystals is about 20/80 to about 80/20. The alkali silicate may be forced into the reaction vessel containing the produced slurry of calcium silicate crystals. Examples of useful alkali silicates are sodium silicate, potassium silicate, lithium silicate, etc. The thus obtained aqueous slurry comprising the slurry of calcium silicate crystals and the alkali silicate as admixed therewith is reacted with carbon dioxide gas for carbonation. The carbonation satisfactorily proceeds even at ambient temperature and atmospheric pressure insofar as carbon dioxide gas is introduced. Preferably the carbonation is effected with stirring at elevated temperature and pressure, so that the carbonation is accelerated, making it possible to complete the carbonation in a short time. With the elevation of the temperature for carbonation, the particle size of produced granular amorphous silica tends to increase in said range.

The alkali silicate can be mixed during the carbonation reaction.

The reaction product resulting from the carbonation is treated with an acid. The acid treatment is conducted to separate the calcium carbonate and alkali metal carbonate from the reaction product, whereby the product is converted into primary or secondary particles of amorphous silica composite material. Preferred among useful acids are those capable of forming a calcium salt which is easily removed as by washing with water. Examples of desirable acids are hydrochloric acid, nitric acid, acetic acid, perchloric acid, sulfamic acid, benzenesulfonic acid, p-toluenesulfonic acid, 5-sulfosalicylic acid, 4-toluidinesulfamic acid, sulfanilic acid, mixtures of acids optionally selected from these acids, etc. After the acid treatment, the product is washed with water and dried, giving the primary or secondary particles of amorphous silica composite material according to the invention.

The primary particles of amorphous silica composite material according to the invention can be prepared also by crushing the secondary particles of composite material obtained above and dispersing the finer particles as by means of supersonic waves.

The shaped bodies of amorphous silica composite material according to the invention are composed of either or both of primary and secondary particles of amorphous silica composite material three-dimensionally interlocked with one another.

The shaped bodies of amorphous silica composite material according to the invention have the features that they retain the original excellent adsorbing properties of the primary and secondary particles of amorphous silica composite material and they have a density of about 0.1 to about 0.4 g/cm$^3$, a bending strength of at least 3 kgf/cm$^2$, namely a high strength although exceedingly lightweight, and outstanding insulating properties.

The shaped bodies of amorphous silica composite material according to the invention can be suitably prepared by, when desired, mixing the aqueous slurry of either or both of primary and secondary particles of amorphous silica composite material with additives, and shaping the slurry with dewatering by press molding, centrifugal molding, sheet molding or like techniques, followed by drying. Examples of useful additives are fibers, clays, cement, binders, surfactants, etc.

In forming the shaped body of amorphous silica composite material according to the invention, the secondary particles of amorphous silica composite material are preferably used in view of shapability, lightweight property, etc.

A preferred mode of the process for producing the shaped body comprises adding alkali silicate to the aqueous slurry of secondary particles of calcium silicate crystals, bringing the mixture into carbon dioxide gas, treating the same with an acid, shaping the mass and drying the shaped mass. A modified process is also available in which shaping is conducted immediately before or after bringing the mixture into contact with carbon dioxide gas. A further option is a process in which the carbonation and acid treatment are effected after immersing the shaped body of secondary particles of calcium silicate crystals in alkali silicate.

The primary and secondary particles of amorphous silica composite material according to the invention have an excellent property of adsorbing water, organic materials and so on, so that they are suitable for use as, e.g. drying agents or adsorbing agents for dyeing and are also useful as adsorbent carriers, catalyst carriers, deodorants, fillers, pigments, abrasives or the like. The shaped bodies of amorphous silica composite material according to the invention also find use as building materials, since the shaped bodies not only have an excellent adsorbing property, but also are lightweight and high in strength, and are moreover outstanding in electrical insulating properties and heat insulating properties.

EXAMPLES

The present invention will be described below in more detail with reference to the following Examples and Comparison Examples. In the following Examples and Comparison Examples, the parts and percentages are all by weight and the properties were determined by the following procedures.

(a) Apparent specific gravity—determined by the method according to JIS K 6220

(b) Density—determined by the method according to JIS A 9510

(c) Test for hygroscopicity—conducted by the method according to JIS Z 0701

(d) Bending strength—determined by the method according to JIS A 9510

(e) Thermal conductivity—determined by the plane plate-comparing method according to JIS A 1412

(f) Test for adsorption of organic substance—A 100 ml conical flask equipped with a plug and charged with 100 ppm of an aqueous solution of methylene blue and 200 mg of a test sample was shaken in a constant-temperature bath maintained at 25° C. for 24 hours and the contents in the flask were filtered. The absorbance of the filtrate was measured at 665 nm to determine the rate of decoloration.

The silica particles obtained in the Examples were subjected to X-ray diffraction and was confirmed to be amorphous.

Example 1

Quick lime slaked in warm water was added to a ferro-silicon dust forcedly dispersed in water to achieve a CaO/SiO$_2$ molar ratio of 1.00. Water was further added so that the ratio of water to solids content was adjusted to 24, giving a starting slurry. The slurry thus obtained was placed into an autoclave equipped with an agitating element and was reacted under a saturated steam pressure of 15 kgf/cm$^2$ for 3 hours while rotating the agitating element at 100 rpm. The reaction gave an aqueous slurry of substantially globular secondary particles of calcium silicate crystals having a diameter of 10 to 30 μm and composed of agglomerated xonotlite crystals. The slurry of the secondary particles was dispersed with ultrasonic waves to obtain an aqueous slurry of primary particles of xonotlite crystals.

Thereafter, the slurry obtained above (containing 50% SiO$_2$ (A) based on total solids content) was mixed with sodium silicate of JIS No. 3 (containing 29% SiO$_2$ (B) based on total solids content) so that the ratio of SiO$_2$ (A) to SiO$_2$ (B) in the shaped body was 1:1. Carbon dioxide gas was forced into the mixture while rotating the agitating element at 100 rpm, whereupon the mixture was reacted at 80° C. and 2 kgf/cm$^2$ for 6 hours. The reaction product thus obtained was immersed in 3N hydrochloric acid for 1 hour, washed with water and dried at 100° C., whereby primary particles of amorphous silica composite material of the present invention were obtained. The photograph of FIG. 1 shows the primary particles as observed under a scanning electron microscope (25000 X). FIG. 1 confirmed that the primary particles were composed of granular amorphous silica particles having a particle size of 100 to 1000Å which were attached to the surface of amorphous silica particles having a crystalline appearance and retaining the original needle-like configuration of xonotlite crystals.

Table 1 shows the properties of the obtained primary particles of amorphous silica composite material of the invention.

TABLE 1

| Apparent specific gravity (g/cm$^3$) | | 0.10 |
|---|---|---|
| Amount of absorbed moisture (%) | Relative humidity (20%) | 2.9 |
| | Relative humidity (50%) | 5.1 |
| | Relative humidity (90%) | 24.8 |
| Rate of decoloration of methylene blue (%) | | 98 |

Example 2

Silica stone was mixed with quick lime slaked in warm water to achieve a CaO/SiO$_2$ molar ratio of 1.00. Water was added thereto to adjust the ratio of water to the solids content to 12, giving a starting slurry. The slurry thus obtained was subjected to hydrothermal synthesis reaction in the same manner as in Example 1. The reaction gave an aqueous slurry of substantially globular secondary particles of calcium silicate crystals, i.e. agglomerated xonotlite crystals, having a particle size of 30 to 150 μm.

Sodium silicate of JIS No. 3 was added to the slurry to achieve the same ratio of SiO$_2$ (A) to SiO$_2$ (B) as in Example 1. Carbon dioxide gas was forced into the mixture while rotating the agitating element at 100 rpm, whereupon the mixture was reacted at 80° C. and 2 kgf/cm$^2$ for 6 hours. The reaction product was immersed in hydrochloric acid, washed with water and dried at 100° C. as done in Example 1, whereby secondary particles of amorphous silica composite material according to the invention were obtained. The secondary particles were observed under a scanning electron microscope and microscopically shown in FIG. 2A (1500 X, showing the secondary particles as a whole) and FIG. 2B (25000 X, a photograph showing the surface of the secondary particle as enlarged). These figures confirmed that the secondary particles were substantially globular, 30 to 150 μm in particle size and composed of primary particles randomly three-dimensionally interlocked with one another, the primary particles being formed of granular amorphous silica particles 100 to 1000Å in particle size attached to the surface of amorphous silica particles having a crystalline appearance and retaining the original strip-like configuration of xonotlite crystals.

Table 2 shows the properties of the obtained secondary particles of amorphous silica composite material according to the invention.

TABLE 2

| Apparent specific gravity (g/cm$^3$) | | 0.11 |
|---|---|---|
| Amount of absorbed moisture (%) | Relative humidity (20%) | 3.6 |
| | Relative humidity (50%) | 5.4 |
| | Relative humidity (90%) | 35.9 |
| Rate of decoloration of methylene blue (%) | | 99 |

Example 3

The product of carbonation reaction prepared in the same manner as in Example 2 was immersed in hydrochloric acid and washed with water, giving an aqueous slurry of secondary particles of amorphous silica composite material. To the slurry thus obtained were added glass fibers in an amount of 5% of the total solids content and the mixture was shaped by a press with dewatering into a mass measuring 300×300×25 min. The mass was dried at 100° C., giving a shaped body of amorphous silica composite material of the invention having a density of 0.15 g/cm$^3$. Observation under a scanning electron microscope confirmed that the shaped body was composed of the secondary particles of amorphous silica composite material randomly three-dimensionally interlocked with one another in the same manner as in Example 2.

Table 3 shows the properties of the obtained shaped body of amorphous silica composite material.

TABLE 3

| Amount of absorbed moisture (%) | Relative humidity (20%) | 3.3 |
|---|---|---|
| | Relative humidity (50%) | 5.2 |
| | Relative humidity (90%) | 35.0 |
| Rate of decoloration of methylene blue (%) | | 99 |
| Bending strength (kgf/cm$^2$) | | 4.9 |
| Thermal conductivity | | 0.036 |

In Table 3, the thermal conductivity was measured at an average temperature of 70° C.

Comparison Example 1

Figure 3:
FIG. 3 is a scanning electron micrograph (magnification of 25,000 X) showing the secondary particles of amorphous silica prepared in Comparison Example 1.

Hydrothermal synthesis reaction, injection of carbon dioxide gas, immersion in an acid, washing with water and drying were conducted in the same manner as in Example 2 except that sodium silicate of JIS No. 3 was not used, giving substantially globular secondary particles of amorphous silica having a crystalline appearance and a diameter of 30 to 150 μm. The secondary particles were observed under a scanning electron microscope and microscopically shown in FIG. 3 (25000 X, showing the surface of the secondary particle as enlarged). The micrograph confirmed that the secondary particles were composed of primary particles of amorphous silica which were randomly three-dimensionally interlocked with one another, and which had a crystalline appearance and retained the original strip-like configuration of xonotlite crystals.

Table 4 shows the properties of the obtained secondary particles of amorphous silica having a crystalline appearance.

TABLE 4

| Apparent specific gravity (g/cm$^3$) | | 0.067 |
|---|---|---|
| Amount of absorbed moisture (%) | Relative humidity (20%) | 3.4 |
| | Relative humidity (50%) | 5.3 |
| | Relative humidity (90%) | 17.4 |
| Rate of decoloration of methylene blue (%) | | 73 |

Comparison Example 2

Sodium silicate of JIS No. 3 as used in Example 1 was diluted with water in an amount of 5 times the quantity of the sodium silicate used. Carbon dioxide gas was forced into the mixture while rotating the agitating element at 100 rpm, whereupon the mixture was reacted at 80° C. and 2 kgf/cm$^2$ for 6 hours. The reaction product was washed with water and dried at 100° C., giving a silica gel of the wet process type.

Figure 4:
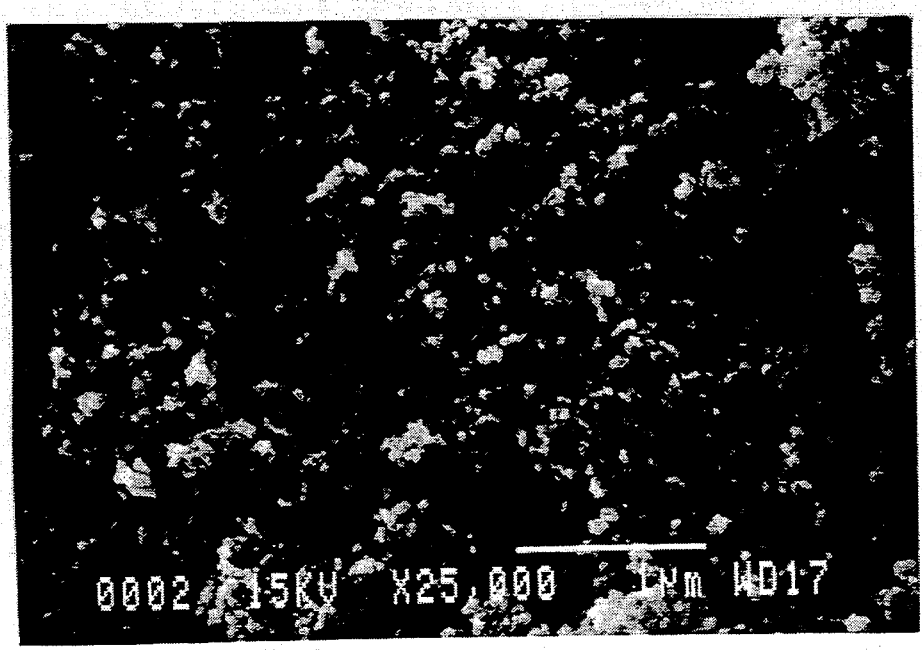
FIG. 4 is a scanning electron micrograph (magnification of 25,000 X) showing the silica gel prepared in Comparsion Example 2.

The wet process type silica gel thus obtained was observed under a scanning electron microscope and microscopically shown in FIG. 4 (25000 X). FIG. 4 shows that the silica gel obtained is in the form of granules having a particle size of 100 to 1000Å.

Table 5 shows the properties of the obtained silica gel.

TABLE 5

| | | |
|---|---|---|
| Apparent specific gravity (g/cm$^3$) | | 0.38 |
| Amount of absorbed moisture (%) | Relative humidity (20%) | 4.6 |
| | Relative humidity (50%) | 6.2 |
| | Relative humidity (90%) | 15.5 |
| Rate of decoloration of methylene blue (%) | | 90 |

To the silica gel were added glass fibers in an amount of 5% and water and the mixture was shaped by a press with dewatering into a mass measuring 300×300×25 mm. When the mass was dried at 100° C., the shaped mass was brittle and collapsed into powder.

We claim:

1. A primary particle of amorphous silica composite material comprising:
   (i) a plurality of granular amorphous silica particles which are derived from at least one of sodium silicate, potassium silicate and lithium silicate; and
   (ii) an amorphous silica particle which is derived from a primary particle of calcium silicate crystal and which substantially retains the shape and size of said calcium silicate crystal;
   said granular amorphous silica particles (i) being randomly attached to said amorphous silica particle (ii).

2. The primary particle of amorphous silica composite material according to claim 1 wherein the granular amorphous silica particle has a particle size of about 50 to about 2,000Å.

3. A secondary particle of amorphous silica composite material which comprises a plurality of primary particles of claim 1 randomly three-dimensionally interlocked with one another and which is in the form of a substantially globular particle having a diameter of about 10 to about 150 μm.

4. A shaped body of amorphous silica composite material, comprising a plurality of the primary particles of claim 1 which are randomly three-dimensionally interlocked with one another.

5. A shaped body of amorphous silica composite material, comprising a plurality of the secondary particles of claim 3 randomly three-dimensionally interlocked with one another.

6. A process for producing primary particles of amorphous silica composite material, comprising the steps of adding at least one of sodium silicate, potassium silicate and lithium silicate to an aqueous slurry of primary particles of calcium silicate crystals, carbonating the mixture, and treating the reaction product with an acid.

7. A process for producing secondary particles of amorphous silica composite material, comprising the steps of adding at least one of sodium silicate, potassium silicate and lithium silicate to an aqueous slurry of secondary particles of calcium silicate crystals, carbonating the mixture and treating the reaction product with an acid.

8. A process for producing a shaped body of amorphous silica composite material, comprising the steps of shaping an aqueous slurry of primary particles of amorphous silica composite material into a shaped mass and drying the mass, said primary particles of amorphous silica composite material comprising:
   (i) a plurality of granular amorphous silica particles which are derived from at least one of sodium silicate, potassium silicate and lithium silicate; and
   (ii) an amorphous silica particle which is derived from a primary particle of calcium silicate crystal and which substantially retains the shape and size of said calcium silicate crystal; said granular amorphous silica particles (i) being randomly attached to said amorphous silica particle (ii).

9. A process for producing a shaped body of amorphous silica composite material, comprising the steps of shaping an aqueous slurry of secondary particles of amorphous silica composite material into a shaped mass and drying the mass, said secondary particle of amorphous silica material comprising a plurality of primary particles of amorphous silica composite material randomly three-dimensionally interlocked with one another and being in the form of a substantially globular particle having a diameter of about 10 to about 150 μm, said primary particle of amorphous silica composite material comprising:
   (i) a plurality of granular amorphous silica particles which are derived from at least one of sodium silicate, potassium silicate and lithium silicate; and
   (ii) an amorphous silica particle which is derived from a primary particle of calcium silicate crystal and which substantially retains the shape and size of said calcium silicate crystal; said granular amorphous silica particles (i) being randomly attached to said amorphous silica particle (ii).

* * * * *